Nov. 12, 1963    G. FORRESTER ETAL    3,110,110
WEB CALIPER MEASURING APPARATUS
Filed Jan. 5, 1961    3 Sheets-Sheet 1

INVENTORS
GILBERT FORRESTER
CLYDE P. GRANT
BY
Porter, Chittick, Russell & Pfund
ATTORNEYS Nov. 12, 1963  G. FORRESTER ETAL  3,110,110
WEB CALIPER MEASURING APPARATUS
Filed Jan. 5, 1961  3 Sheets-Sheet 2
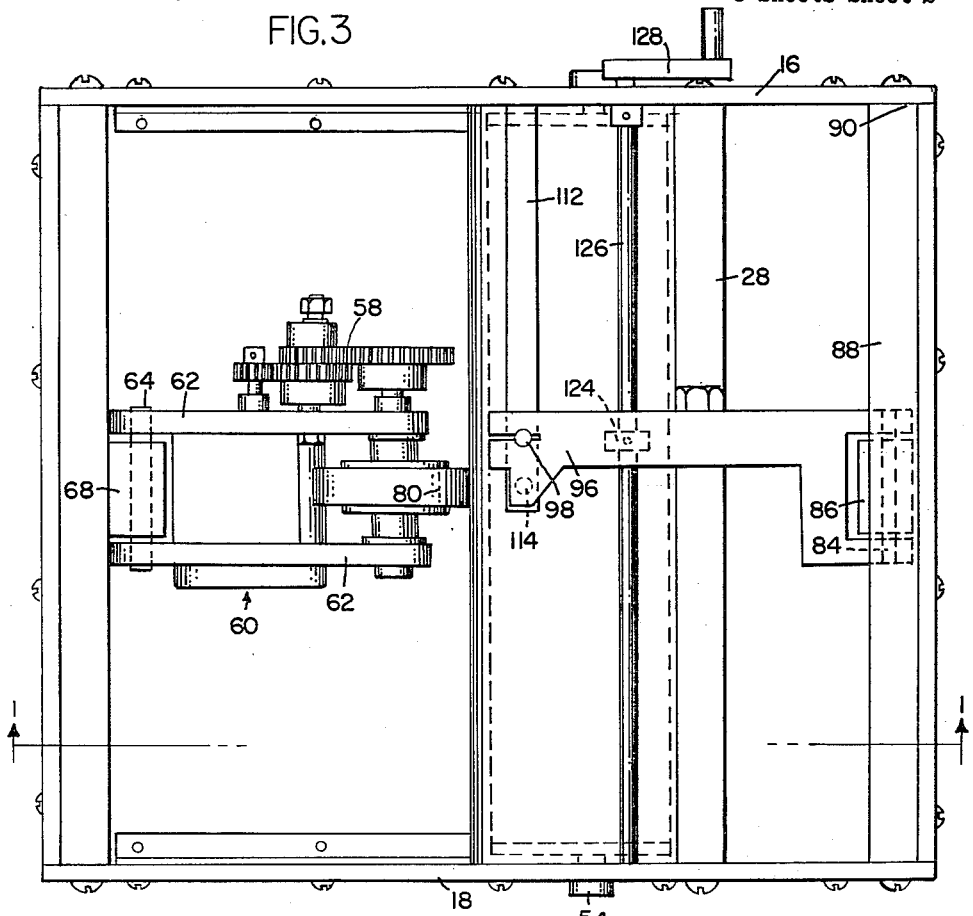
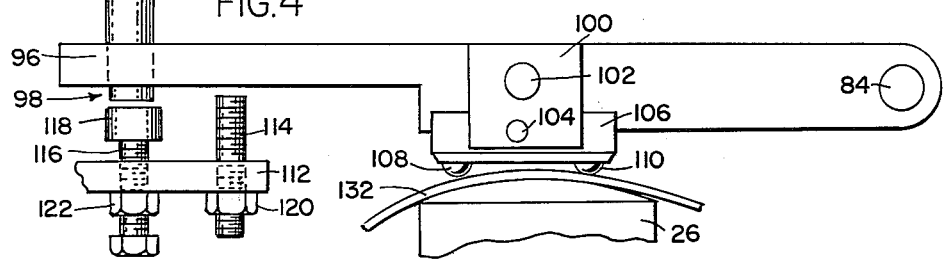
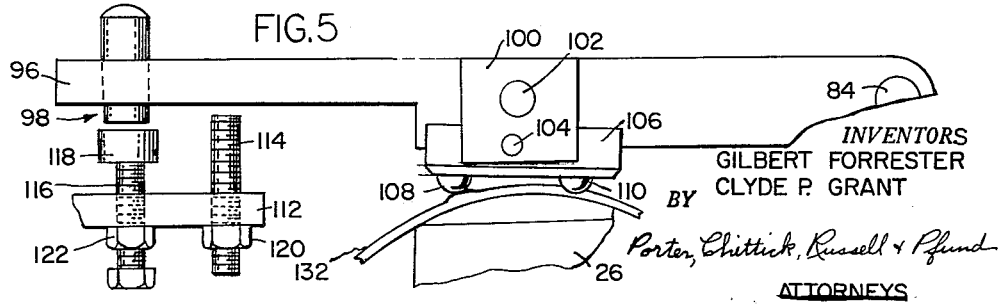
INVENTORS
GILBERT FORRESTER
CLYDE P. GRANT
BY Porter, Chittick, Russell & Pfund
ATTORNEYS Nov. 12, 1963   G. FORRESTER ETAL   3,110,110
WEB CALIPER MEASURING APPARATUS Filed Jan. 5, 1961   3 Sheets-Sheet 3

INVENTORS
GILBERT FORRESTER
CLYDE P. GRANT
BY
Porter, Chittick, Russell & Pfund
ATTORNEYS 3,110,110
WEB CALIPER MEASURING APPARATUS
Gilbert Forrester, Falmouth, and Clyde P. Grant, Gorham, Maine, assignors to S. D. Warren Company, Boston, Mass., a corporation of Massachusetts
Filed Jan. 5, 1961, Ser. No. 80,900
8 Claims. (Cl. 33—149)

This invention relates to improved means for detecting and measuring changes in caliper of a moving web of flexible material such as paper.

Various forms of web caliper devices have been provided in the past for continuously sensing the thickness of a moving web of material such as a strip of paper. In measurements where the actual physical thickness dimension of the sheet is required, a contacting thickness gauge is generally employed in which a mechanical element contacts the surface of the moving sheet and the deflection of the element from a nominal position produces an indication of the deviation of the thickness of the sheet from the specification value. Where the measured sheet consists of paper or other thin material it is often difficult to detect changes in thickness because minute surface irregularities occur which mask the thickness change since both are of the same order of magnitude. It is a feature of the present invention to obtain useful thickness measurements of thin sheets which have significant surface irregularities.

An object of the present invention is to provide a new and improved web caliper measuring apparatus.

Another object of the invention is to provide means for detecting and measuring average changes in the caliper of a moving web.

An additional object of this invention is to provide for measuring the continuous thickness profile of a paper sheet with sufficient sensitivity to detect small changes in the caliper of the sheet in the presence of minute surface irregularities which are of the same order of magnitude as the changes in web caliper.

Other objects, and features, of the present invention will appear from the following description of one preferred embodiment thereof illustrated by the accompanying drawings wherein:

FIG. 3 is a plan view of the assembled detector taken with the top cover plate removed;

FIGS. 4 and 5 are fragmentary views in side elevation of the detector mechanism showing two positions respectively;

Figures 1, 2:
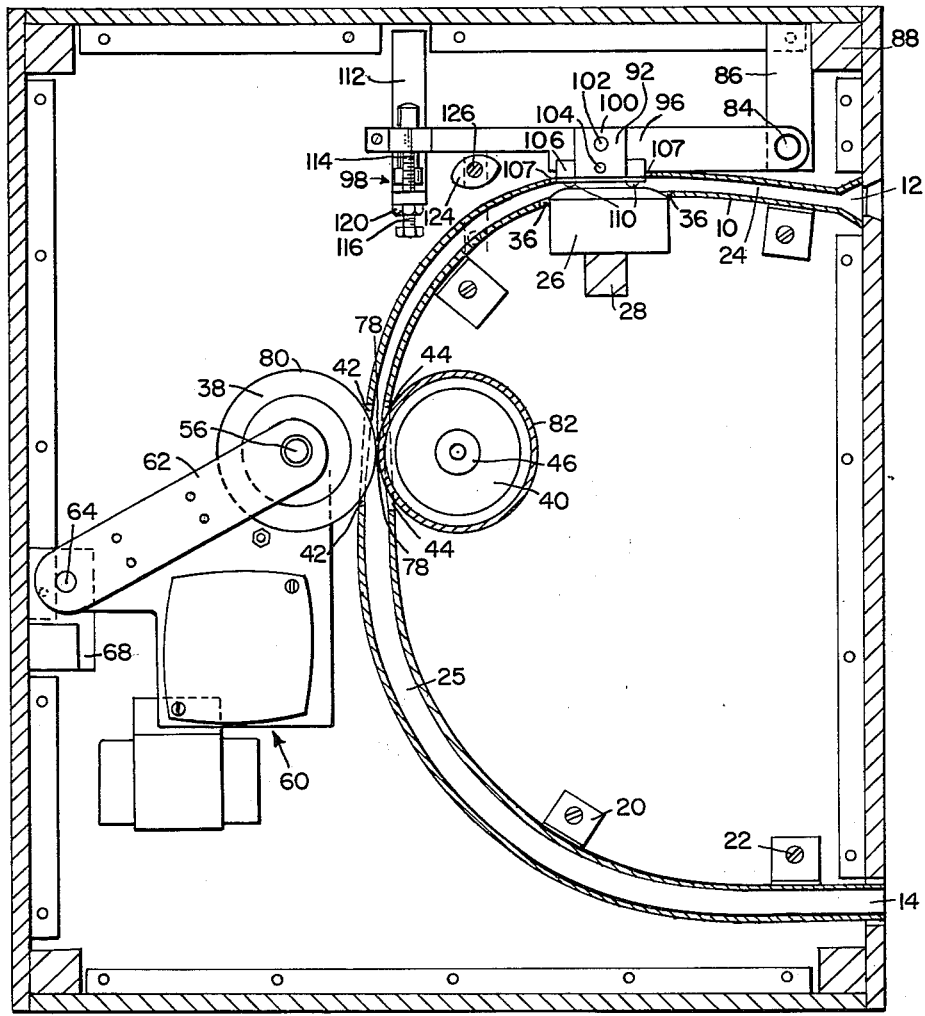
FIG. 1 is a cross-sectional side view of the assembled web caliper detector taken through the line 1—1 of FIG. 3.
FIG. 2 is a perspective view of a guide chute through which the web sample is drawn while in the detector for inspection.

Referring now to FIGS. 1, 2 and 3, a preferred embodiment of the invention comprises a curved guide chute 10 with an open feed end 12 and an open delivery end 14. The guide chute 10 is secured to frame side walls 16, 18 by means of suitable brackets 20. The chute 10 forms a curved interior passage having an upper region 24 and an enlarged lower region 25. An anvil 26, resting on a bar 28 whose ends are secured to the respective walls 16, 18 extends through an opening 36 in the underside of the chute into the region 24. A driven wheel 38 and an idler roll 40 are positioned so that opposing portions of their circumferences also extend, through respective openings 42, 44 in the chute 10.

The anvil 26 has a smooth hard upper surface 27 formed of suitable material.

Figure 7:
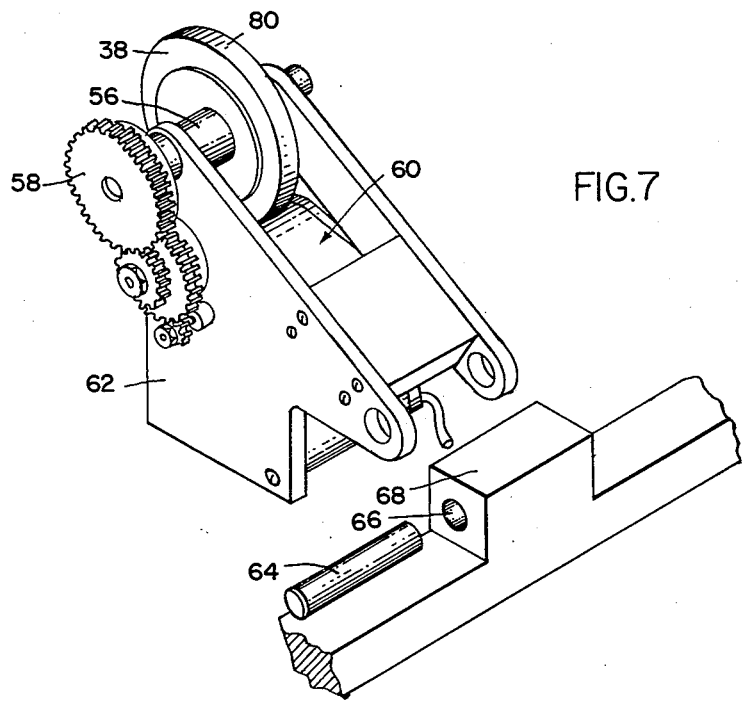
FIG. 7 is an exploded perspective view of the driven wheel assembly used to move the web sample through the detector and the associated end wall supporting bracket.

The idler roll 40 has a smooth surface layer 82 and is rotatively mounted on a shaft 46. The wheel 38 has a traction surface 80 and is fixedly mounted on an axle 56 which is driven through a gear train 58 by a motor indicated generally at 60. As best seen in FIG. 7, the wheel 38, axle 56, gear train 58, and motor 60 are supported in a bracket 62 which itself is pivotally mounted on a horizontal rod 64 supported in a bushing 66 in a support bar 68 which is secured to the respective frame side walls 16, 18. The wheel 38 rests against the idler roll 40 at a point of contact 78 for outboard support of the bracket assembly 62. When the wheel is driven by the motor 60 and gear train 58 the idler roll 40 is driven in the opposite direction by contact with the wheel 38 at the point 78.

A sensing arm 96 is pivotally supported on shaft 84 which is mounted on members 86, 88 to the end walls 16, 18. The arm 96 supports at its free end a conventional distance detector 98. The distance detector 98 may be any suitable device having a pair of relatively movable elements for producing an electrical signal in accordance with their separation. Mounted on the arm 96 is a block 100 having downwardly extending lugs 90, 92 which are spaced to receive a dolly 106. The dolly 106 is mounted by a pin 104 to the lugs 90, 92 for limited angular movement, the lower portion of the dolly 106 extending into the chute region 24 through an opening 107 in the upper surface of the chute 10. Contact knobs 110 of any suitable material are rigidly affixed to the dolly 106, their respective centers being spaced not further apart than the usable upper surface length of the anvil 26.

Figure 6:
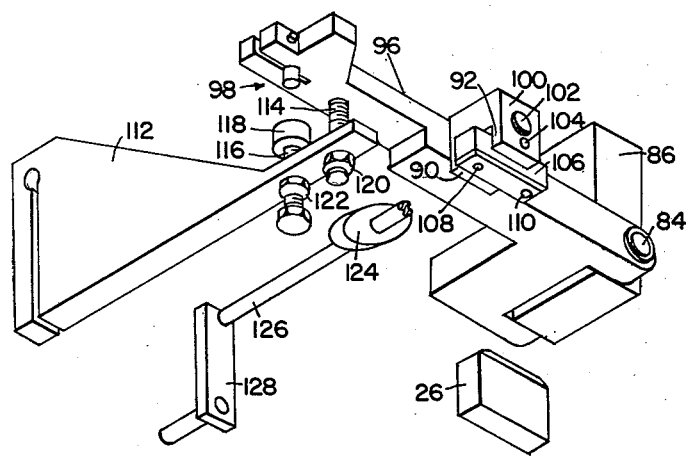
FIG. 6 is an exploded perspective view of the detector mechanism of FIG. 1.

A fixed bracket 112 as shown in FIG. 6, is fastened to the frame side wall 16 and supports a stop screw 114 and a second screw 116 for maintaining a measuring plate 118 immediately below the distance detector 98 and the sensing arm 96. Nuts 120, 122 are respectively provided to aid in securing the screws 114, 116 in various positions of adjustability in the support bracket 112. A lift cam 124 is provided immediately below the sensing arm 96 on a shaft 126 which revolves in bushings in the frame side walls 16, 18 and extends through the frame side wall 16, terminating outside the wall 16 in a crank 128. The measuring plate 118 constitutes one of the relatively movable elements of the distance detector 98.

The operation of the disclosed web caliper apparatus to obtain the thickness profile of a paper sheet will now be described. The apparatus is arranged with the distance sensing elements 98 and 118 connected to a suitable measuring device. For example, if the surfaces 98 and 118 constitute the plates of a capacitor in a capacitance gauge the electrical signal derived by the variation in capacitance due to the change in distance between the surfaces of the elements 98 and 118 can be converted directly into a representation of distance. Other suitable electrical or electromagnetic signal arrangements for deriving a signal directly proportional to the distance between the elements 98 and 118 can be employed. As such devices are generally well known and are not part of the present invention per se no particular measurement circuit has been described. The output of the measuring device 98 will generally be connected to an indicator calibrated in thickness and may, if desired, be recorded on a recording chart to produce a permanent record of the profile. For this purpose the drive for the paper through the chute 10 and the paper drive in the recording chart may be synchronized.

To measure a sheet of paper with the apparatus of the invention a suitable size sheet is inserted at the mouth 12 of the chute 24 to pass between the upper surface of the anvil 26 and the knobs 108 and 110. This may be accomplished by manually raising the arm assembly 96 by means of the cam 124 turned by crank 128. The sheet of paper is inserted a sufficient distance to be engaged by the frictional contact between the wheel 38 and the roller 40 which thereby drives the sheet through the portion 25 of the chute where the paper is discharged at the opening 14. In driving the sheet through the chute 10 the central position of the tire 38 tends to steer the sheet relative to the sides of the chute and if the sheet is misaligned initially the central drive tends to straighten the sheet as it continues through the chute.

The operation of the device to obtain accurate measurements of the caliper of the paper passing the measuring station at the anvil 26 can best be described with reference to FIGS. 4 and 5. In FIG. 4 the passage of a uniform thickness sheet 132 is shown which produces a separation between the elements 98 and 118 to provide the electrical signals for indicating the caliper of the sheet. As the caliper of the sheet 132 changes the spacing between the elements 98, 118 will change proportionally to produce the desired output signals representing sheet thickness. The minute variations in the sheet which occur continuously over its surface and which produce unacceptably high variations in the thickness signal if a single point on the surface of the sheet is inspected produce substantially no variations in the output signal of the caliper device constructed in accordance with the present invention. In FIG. 5 a representation of the action of the dolly 106 to eliminate these unwanted variations in the output signal is shown. Since the dolly 106 is pivoted on the pin 104 a local variation in the paper will produce a downward or upward deflection of one of the balls 108 or 110 as it passes the respective positions of the balls. Thus depressions will produce successive downward movement of the balls 108 and 110 while bumps, creases and other high spots will produce successive upward movement of the balls 108, 110 in each case pivoting the dolly 106 about the pin 104. This action minimizes the effect of such local variations on the actual deflection of the arm 96 and due to the random nature of these variations the average deflection of the arm 96 due to the rapid oscillation about pivot pin 104 of the dolly 106 tends to be smooth as is the signal obtained from the measuring device operated by the variation in distance between the elements 98, 118. Thus as illustrated in FIG. 5 a bump under ball 108 and a depression under the ball 110 provide conditions which do not result in any displacement whatever of the axis of pin 104 relative to the support pivot 84 for the arm 96.

While the particular condition illustrated in FIG. 5 is merely illustrative of one possible set of conditions that may exist at given instant of time, it has been found in the practice that the employment of the pivotal dolly 106 and the spaced contact points 108, 110 permits substantially complete elimination of noise-like variations in the output signal obtained from the electrical measuring system operated by the device. With these noise-like components eliminated the true caliper of sheet 132 is obtained and may be recorded by operating a recording meter from the output of the measuring circuits. The profile thus obtained is quite useful whereas with a single point contact measuring device of the prior art the signal obtained has been quite often useless due to the large random fluctuations which occurred. These fluctuations tended to mask any variations in the actual caliper of the sheet since they were superimposed on such variations in the chart record of the profile.

While the invention has been described with relation to a particular embodiment it will be appreciated that the invention is not limited to such embodiment but may be applied in various ways without departing from the spirit of the present teaching. The invention accordingly is to be limited only by the scope of the appended claims.

We claim:

1. Web caliper apparatus for measuring the thickness profile of a sheet of material comprising a measuring station including a stationary anvil having a smooth surface for supporting said sheet at said station, a dolly, means for mounting said dolly opposed to and movable toward and away from said surface, a pair of spaced smooth fixed contacts projecting from said dolly toward said surface, means for urging said contacts and said surface into contact, a pivot connection intermediate said contacts for supporting said dolly on said mounting means, means for transporting in a direction aligned with said contacts said sheet past said station with said sheet between said contacts and said surface, and means for sensing the deflection of said movable mounting means relative to said surface.

2. Apparatus according to claim 1 in which said projections are generally hemispherical shaped bodies.

3. Web caliper apparatus for measuring the thickness profile of a sheet of material comprising a chute formed with two closely spaced walls having a transverse dimension greater than the width of said sheet, an idler roller extending substantially completely across said dimension of said chute and having the periphery of said roller projecting through one of said walls into said chute, a driven wheel centrally located relative to said transverse dimension and movably supported to be urged through the other of said walls into driving contact with said roller, a measuring station having relatively movable opposed surface contact members projecting into said chute, means for feeding a sheet of said material into said chute to be drawn between said contact members by engagement between said wheel and said roller, and means for sensing the relative deflection of said contact members.

4. Web caliper apparatus for measuring the thickness profile of a sheet of material comprising a chute formed with two closely spaced walls having a transverse dimension greater than the width of said sheet, an idler roller extending substantially completely across said dimension of said chute and having the periphery of said roller projecting through one of said walls into said chute, a driven wheel centrally located relative to said transverse dimension and movably supported to be urged through the other of said walls into driving contact with said roller, a measuring station including a stationary anvil having a smooth surface projecting into said chute at said measuring station, a dolly, means for movably mounting said dolly opposed to said surface, a pair of spaced smooth fixed contacts projecting from said dolly toward said surface, a pivot connection intermediate said contacts for supporting said dolly on said movable mounting means, means for feeding a sheet of said material into said chute to be drawn between said surface and said contacts by engagement between said wheel and said roller, and means for sensing the deflection of said movable mounting means relative to said surface.

5. Web caliper apparatus for measuring the thickness profile of a sheet of material comprising a measuring station including a stationary anvil having a smooth surface for supporting said sheet at said station, a measurement arm pivotally supported at one end and extending generally parallel to said surface, means located at the free end of said arm for detecting deflection of said arm from a predetermined position, a dolly supported by a pivotal connection to said arm opposite said surface, a pair of smooth fixed contacts projecting from said dolly on opposite sides of said pivotal connection, means for urging said anvil and said projections into contact, and means for transporting said sheet between said surface and said projections.

6. Apparatus according to claim 5 in which said smooth contacts are generally hemispherical shaped bodies.

7. Web caliper apparatus for measuring the thickness profile of a sheet of material comprising a chute having a transverse dimension greater than the width of said sheet, an idler roll extending across said dimension of said chute and having the periphery of said roller projecting into said chute, a driven wheel centrally located relative to said transverse dimension and movably supported to be urged into driving contact with said roller, a measuring station including a stationary anvil having a smooth surface projecting into said chute at said measuring station, a measurement arm pivotally supported at one end and extending generally parallel to said surface, means located at the free end of said arm for detecting deflection of said arm from a predetermined position, a dolly supported by a pivotal connection to said arm opposite said surface, a pair of smooth fixed contacts projecting into said chute from said dolly on opposite sides of said pivotal connection, means for urging said anvil and said projections into contact, and means for feeding a sheet of said material into said chute to be drawn between said surface and said contacts by engagement between said wheel and said roller.

8. Means for measuring the thickness of a thin sheet of material in which the surface of said sheet has minute irregularities comprising a smooth stationary reference surface, means for drawing said sheet over said reference surface, a member substantially coextensive with said reference surface, a plurality of spaced fixed contacts projecting from said member and in surface contact with said sheet opposite said reference surface, a support movable relative to said reference surface, pivotal connection means between said member and said support located intermediate said spaced contacts, deflection detecting means, and means for deflecting said detecting means in accordance with the relative deflection of said reference surface and said support.

References Cited in the file of this patent

UNITED STATES PATENTS

| | | |
|---|---|---|
| 1,858,304 | McLaughlin | May 17, 1932 |
| 2,352,650 | Metcalf | July 4, 1944 |
| 2,843,937 | Allen | July 22, 1958 |
| 2,864,171 | Edling et al. | Dec. 16, 1958 |

FOREIGN PATENTS

| | | |
|---|---|---|
| 481,942 | Italy | June 17, 1953 |
| 295,116 | Switzerland | Feb. 16, 1954 |